United States Patent
Durbin et al.

(10) Patent No.: US 7,219,222 B1
(45) Date of Patent: May 15, 2007

(54) METHOD AND SYSTEM TO GRANT ACCESS TO SOFTWARE OPTIONS RESIDENT ON A MEDICAL IMAGING DEVICE

(75) Inventors: Winnie C. Durbin, Dousman, WI (US); John L. Schmidt, Wales, WI (US); David Precord, Hartford, WI (US); Michael Minogue, Milwaukee, WI (US); Geoffrey Christanday, Milwaukee, WI (US); Esmeraldo Davantes, Pewaukee, WI (US); Bobby Keen, New Berlin, WI (US)

(73) Assignee: GE Medical Technology Services, Inc., Pewaukee, WI (US)

( * ) Notice: Subject to any disclaimer, the term of this patent is extended or adjusted under 35 U.S.C. 154(b) by 883 days.

(21) Appl. No.: 09/683,561

(22) Filed: Jan. 18, 2002

(51) Int. Cl.
G06F 1/24 (2006.01)
G06F 9/00 (2006.01)
G06F 7/04 (2006.01)
G06F 17/30 (2006.01)
G06Q 99/00 (2006.01)
H04K 1/00 (2006.01)
H04L 9/00 (2006.01)

(52) U.S. Cl. .................. 713/100; 713/183; 726/33; 705/51; 705/55; 705/59; 705/78

(58) Field of Classification Search .............. 713/191, 713/100, 183; 705/55, 51, 59, 33, 78; 726/33
See application file for complete search history.

(56) References Cited

U.S. PATENT DOCUMENTS

| | | | | |
|---|---|---|---|---|
| 5,442,541 A | * | 8/1995 | Hube et al. ............. | 700/9 |
| 5,677,953 A | * | 10/1997 | Dolphin ................. | 705/51 |
| 5,708,709 A | * | 1/1998 | Rose ..................... | 705/59 |
| 5,790,664 A | * | 8/1998 | Coley et al. ........... | 709/203 |
| 5,845,065 A | * | 12/1998 | Conte et al. ........... | 726/31 |
| 5,893,099 A | * | 4/1999 | Schreiber et al. ..... | 707/10 |
| 5,938,730 A | * | 8/1999 | Tobita ................... | 709/224 |
| 6,243,692 B1 | * | 6/2001 | Floyd et al. .......... | 705/59 |
| 6,301,666 B1 | * | 10/2001 | Rive ..................... | 713/200 |
| 6,381,557 B1 | * | 4/2002 | Babula et al. ......... | 702/183 |
| 6,490,684 B1 | * | 12/2002 | Fenstemaker et al. | 713/182 |

(Continued)

OTHER PUBLICATIONS

Castagna, Rich. "Something for Nothing—Phone for free, save on books, or build a home page on the house. The Web offers an abundance of free stuff—but watch out for strings", Computer Shopper, Mar. 2001.*

(Continued)

*Primary Examiner*—Kambiz Zand
*Assistant Examiner*—Michael J. Simitoski
(74) *Attorney, Agent, or Firm*—Ziolkowski Patent Solutions Group, SC; Michael A. Della Penna; Carl B. Horton

(57) ABSTRACT

A system and method are provided that remotely grants limited access and permits use of resident software options in accordance with terms consistent with an access grant. The invention includes receiving an access request from a user to access a software option resident in memory of a device, determining whether to grant access in response to the request, and generating an electronic enabler in response to the access request that is transmitted from a centralized facility to a user of the remote device. The electronic enabler is configured to be input into the device whereupon activation of the option is achieved in accordance with terms of the access grant.

27 Claims, 3 Drawing Sheets

U.S. PATENT DOCUMENTS

| | | | |
|---|---|---|---|
| 6,556,894 B1* | 4/2003 | Nguyen | 700/275 |
| 6,584,309 B1* | 6/2003 | Whigham | 455/414.1 |
| 6,618,810 B1* | 9/2003 | Dirie | 713/201 |
| 6,664,893 B1* | 12/2003 | Eveland et al. | 340/539.12 |
| 6,672,505 B1* | 1/2004 | Steinmetz et al. | 235/379 |
| 6,694,384 B1* | 2/2004 | Moeller et al. | 710/8 |
| 6,738,760 B1* | 5/2004 | Krachman | 707/3 |
| 6,795,703 B2* | 9/2004 | Takae et al. | 455/418 |
| 2001/0034712 A1* | 10/2001 | Colvin | 705/52 |
| 2002/0023136 A1* | 2/2002 | Silver et al. | 709/206 |
| 2002/0029347 A1* | 3/2002 | Edelman | 713/193 |
| 2002/0078177 A1* | 6/2002 | Dutta | 709/219 |
| 2002/0090934 A1* | 7/2002 | Mitchelmore | 455/412 |
| 2002/0108054 A1* | 8/2002 | Moore et al. | 713/200 |
| 2002/0124168 A1* | 9/2002 | Mccown et al. | 713/166 |
| 2002/0128842 A1* | 9/2002 | Hoi et al. | 704/260 |
| 2002/0129275 A1* | 9/2002 | Decuir | 713/201 |
| 2002/0152401 A1* | 10/2002 | Zhang et al. | 713/201 |
| 2003/0013434 A1* | 1/2003 | Rosenberg et al. | 455/414 |

OTHER PUBLICATIONS

M2 Presswire. "E2 SOFTWARE: Edisys research shows Internet sales & marketing software can increase e-commerce by 100%" Oct. 1998.*

Pereira, J. et al. "Design and Implementation of a DICOM PACS with Secure Access Via Internet", Oct. 2001 IEEE.*

FOLDOC. "Free On-Line Dictionary of Computing", §email.*

Microsoft Press. Computer Dictionary, Third Edition, 1997 Microsoft Corporation, p. 173.*

* cited by examiner

METHOD AND SYSTEM TO GRANT ACCESS TO SOFTWARE OPTIONS RESIDENT ON A MEDICAL IMAGING DEVICE

BACKGROUND OF INVENTION

The present invention relates generally to a system to enable software-based options resident in memory of a device, and more particularly, to allow customer self-installation of an option enabler in a device that is not connected to a granting centralized facility.

Medical diagnostic devices and supporting systems, such as medical imaging systems, have become increasingly complex in recent years. Examples of such systems include magnetic resonance imaging (MRI) systems, computed tomography (CT) systems, ultrasound and x-ray systems, and positron emission tomography (PET) systems. These systems include many different software-based options, some of which are not used depending on customer needs and costs. To add to the complexity of each particular imaging system, many facilities today incorporate a variety of such devices all of which may not be configured identically. In larger facilities, the systems may be networked to permit common management and control. Further, such systems may be networked with a picture archiving and communication system (PACS) for storing digitized image data for subsequent retrieval and reconstruction. Additionally, teleradiology systems that involve transmitting digitized image data to remote locations for review and diagnosis by specialized physicians and/or radiologists may be used as well.

Because these medical diagnostic systems are used by different facilities with differing needs, not all of these systems operate identically. That is, although identical software may be installed at the factory, certain options are not desired or licensed by a customer or user, and therefore are not enabled when delivered. If a customer later wants to add these options to their devices, a license would need to be executed and service personnel with appropriate training would have to physically travel to the location where the devices are present to enable the software in order for the customer to gain access to a particular option.

While advancements in the provision of remote services to medical diagnostic devices have greatly enhanced the level of service and information exchange, they have not been used to electronically grant access and permit use of software options resident in memory of such devices. Moreover, these known system do not allow a user to self-activate a software option for a limited use period, such as a 30-day trial period.

It would therefore be desirable to design a system and method for granting access to a resident, yet, disabled option for a limited time period. It would also be desirable to design a system that allows a user to electronically request access to the option and electronically receive an electronic enabler that allows the user to activate the option. It would be further desirable to provide a warning of impending access expiration so that a renewing access request may be submitted and approved before expiration if desired, or if not requested, appropriate notice can be provided detailing that the option will no longer be available. Also desirable is a system that automatically contacts the user to verify activation of the option within a short time period after transmission of the electronic enabler.

BRIEF DESCRIPTION OF INVENTION

The present invention is directed to a system and method to electronically receive a request to access resident, but disabled software options and electronically transmit an electronic enabler to the user overcoming the aforementioned concerns.

The present invention includes a system that includes hardware and software located at a centralized facility to identify a customer and, if desirable, license, permit access to, and enable options resident in memory of remote devices. Such a system includes a graphical user interface (GUI) that is displayed as a website (private or public) and that is accessible by a customer from a workstation remote from the centralized facility. The centralized facility is capable of receiving and authenticating a customer identification, validating an access request, and creating an electronic enabler in response to the request to access a disabled option. Software at the centralized facility also generates an electronic contract setting forth terms of a licensing agreement granting access to the option for a predetermined period, e.g., a 30-day trial period. Upon acceptance of the terms of the contract, an electronic enabler such as an alphanumeric pass code is automatically generated. The enabler is encrypted and includes codes setting forth the terms of the usage. Once the electronic enabler is generated by the centralized facility, the centralized facility transmits the electronic enabler through an electronic mail system to the customer workstation. Alternatively, the electronic enabler is displayed on the GUI. Further, an instruction manual having guidelines for use of the option and instructions to activate the option may be transmitted to the user or displayed on the GUI. Once the customer receives the enabler, the customer can then input the enabler to the device and thereby activate the option.

Therefore, in accordance with one aspect of the present invention, a method to remotely permit user enablement of software options resident on a medical imaging device includes receiving a request and I.D. data from a user of a remotely located stand-alone medical imaging device seeking access to a non-enabled option resident on the device. The method further includes generating an electronic enabler configured to enable the non-enabled option and transmitting the electronic enabler to the user. The method further includes providing instructions to the user to install the electronic enabler in the remotely located stand-alone medical imaging device and to activate the option on the remotely located stand-alone medical imaging device.

In accordance with another aspect of the invention, an access granting system comprises a stand-alone device having a data entry module and further having at least one disabled option resident thereon. The system includes a centralized facility located remotely from the user. The system includes a GUI which is displayed in accordance with instructions from a computer to facilitate user activation of the at least one disabled option. The computer is further programmed to receive from a user of the stand-alone device a request to activate the at least one disabled option and generate an alphanumeric code. The computer is also programmed to electronically transmit the alphanumeric code to the user whereupon user inputting of the alphanumeric code on the data entry module activates the at least one disabled option of the stand-alone device.

In accordance with another aspect of the present invention, a computer data signal is provided and embodied in a carrier wave and representing a sequence of instructions which, when executed by at least one processor, causes the processor to receive, at a centralized facility, a request to activate an option resident in memory of a remote stand-alone device from a user remote from the centralized facility. The sequence of instructions also causes the processor to determine whether the end user is qualified, and if so, grant access to the option resident in the remote stand-alone device for a limited time period. A software key is generated by the computer to allow access to the option for the limited time period and sent to the user. The software key upon activation by user allows the user to enable the option.

In accordance with a further aspect of the present invention, a computer readable storage medium is provided and includes a computer program stored thereon. The computer program has a set of instructions that when executed by a computer causes the computer to display a GUI configured to facilitate user activation of a disabled option resident on a medical imaging device. The instructions further cause the computer to receive a number of user inputs from a user remote from the medical imaging device and generate an alphanumeric code in response to the number of user inputs. The alphanumeric code is configured to activate the disabled option upon user inputting of the alphanumeric code on a data entry module of the medical imaging device. The computer is then caused to automatically convey the alphanumeric code to the user.

Various other features, objects and advantages of the present invention will be made apparent from the following detailed description and the drawings.

BRIEF DESCRIPTION OF DRAWINGS

The drawings illustrate a preferred embodiment as presently contemplated for carrying out the invention.

In the drawings.

DETAILED DESCRIPTION

Figure 1:
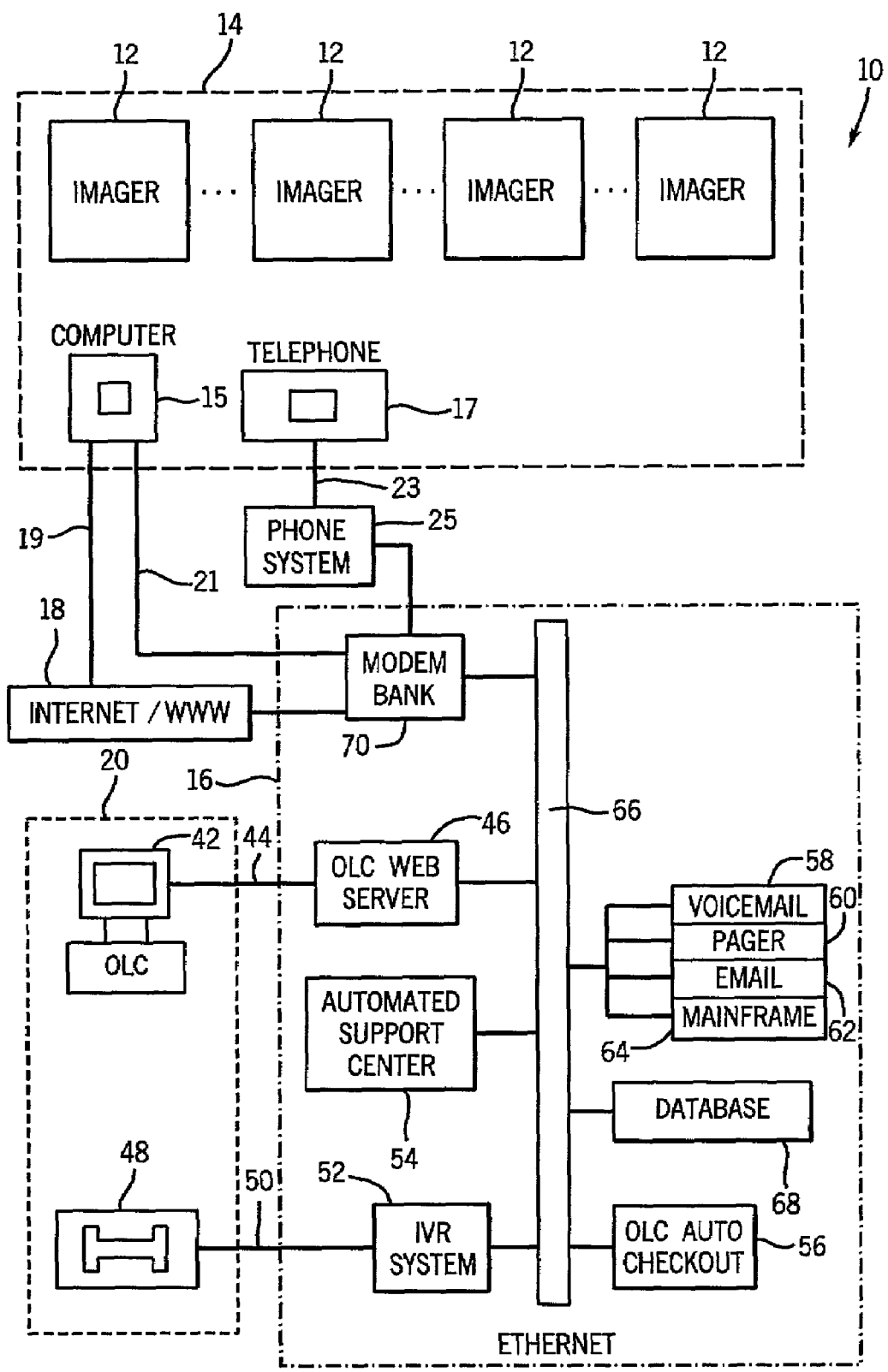
FIG. 1 is a block diagram of a system for which the present invention is implemented therein.

Referring to FIG. 1, an overview block diagram of a medical diagnostic and service system 10 is shown which includes a plurality of remote stand-alone medical devices 12. The plurality of medical diagnostic devices 12 can include a variety of medical diagnostic systems of various modalities. For example, the plurality of medical diagnostics devices can include magnetic resonance imaging (MRI) systems, ultra-sound systems, x-ray systems, computed tomography (CT) systems, as well as, positron emission tomography (PET) systems, or any other type of imaging system. The plurality of diagnostic devices may be centrally located or remotely located from one another in a medical treatment facility 14 such as a hospital. Each medical device 12 has operational software associated therewith which can be configured, serviced, maintained, upgraded, enabled or disabled depending upon the needs of the device 12 itself or the treatment facility 14. As will be discussed with particular reference to FIGS. 2 and 3, each device 12 includes non-enabled software options that, consistent with a user request, can be enabled by the user for a predetermined period of time.

Hospital 14 further includes a plurality of user workstations 15 and telephone stations 17 remotely located from the stand-alone medical imaging devices 12 to, among other tasks, facilitate user activation of a non-enabled software option of a stand-alone medical imaging device 12. Computer workstations 15 and telephone systems 17 allow a user to communicate with a centralized facility 16 remote from the treatment facility 14. As will be discussed, this communication between the user and the centralized facility 16 via computer workstations 15 or telephone systems 17 enable the user to request access to a non-enabled option resident in memory of a stand-alone medical imaging device 12. Each computer workstation 15 includes an internal modem to connect the workstation 15 to a communications link, such as the Internet 18, through link 19 to communicate with the centralized facility 16. Alternatively, computer workstation 15 may be directly connected to the centralized facility 16 via link 21 which can include a dedicated line or an Internet link. As will be discussed shortly, the user may access a graphical user interface via links 19 or 21 to transmit a request to self-activate a disabled option of a stand-alone medical imaging device 12. Alternatively, the user may transmit such a request through telephone system 17. In this embodiment, the user may utilize a telephone system 17 within the medical treatment facility 14 and a telephone connection 23 through a conventional telephone network 25 to transmit a telephonic activation request to the centralized facility 16. In one embodiment, the user may interactively input identification data to request activation of the non-enabled software option or, alternatively, speak directly to a customer service representative who communicates directly with the user to facilitate user activation of the non-enabled software option.

Each workstation 15 described herein and referenced in FIG. 1 may be linked selectively to the centralized facility. According to the present invention, any acceptable network may be employed whether public, open, dedicated, private, or so forth. The communications links to the network may be of any acceptable type, including conventional telephone lines, fiber optic, cable modem links, digital subscriber lines, wireless data transfer systems, or the like. Each of the systems is provided with communications interface hardware and software of generally known design, permitting each to establish network link and exchange data with the centralized facility 16. The systems are provided with interactive software so as to configure the systems and exchange data between the workstations and the centralized facility. In some case, during periods when no data is exchanged between the workstation and the centralized facility, the network connection is terminated. In other cases, the network connection is maintained continuously.

In a further embodiment, a request for access to software-based options that are disabled can be initiated by authorized personnel, such as an on-line engineer or technician, or customer administrative personnel from a computer or workstation 42 in a remote link 20 remote from the medical treatment facility 14, which can be a part of the centralized facility 16, or be separately connected to the centralized facility 16 by a dialup link 44 to a web server 46 in the centralized facility 16. The remote link 20 can also serve to connect the centralized facility 16 to a customer remote from the medical treatment facility 14 by a telephone and telephone connection 48 through a conventional telephone network 50 and to an interactive voice recognition system (IVR) 52 in the centralized facility 16.

The centralized facility 16 includes a number of processing systems including computers for the IVR system 52, an automated support center 54, a web server 46, and an auto checkout server 56, for processing customer and product data and creating an appropriate configuration file. Other processor systems include computers to maintain a voice-mail system 58, a pager system 60, an email system 62, and a main frame 64, and more generally, an output report generator and notifier. Each is connectable and can transmit data through a network, such as an Ethernet 66 with one another, and/or with at least one database 68. However, it is understood that the single representation of a database in FIG. 1 is for demonstrative purposes only, and it is assumed that there is a need for multiple databases in such a system. It is also understood that the IVR system is not only a voice recognition system, but can also process interactive keypad entry from a touchtone telephone 48. A bank of modems 70 is connected to the Ethernet 66 to relay data from the centralized facility 16 to the remote customer work station.

The present invention also includes a method and system for granting access to disabled software options resident in a device and allowing for user self-activation of the options. As previously indicated, the device, including medical imaging equipment, includes installed software that controls options that are typically enabled or disabled manually by a field engineer on-site per a request from a customer. The present invention is directed toward a method and system to remotely grant access to and allow user self-activation of these resident options for a limited use period, e.g., a 30-day trial period, in accordance with terms provided in an access grant, such as a licensing contract. A request to self-activate disabled software options can be made by a qualified customer or any other authorized personnel with appropriate customer identification. The request may be electronically submitted from the remote customer workstation 15 or from the remote link 20 by accessing a GUI configured to facilitate processing of a user request. Alternatively, a telephonic request can be made from a user at or remote from the treatment facility 14 directly to the centralized facility 16.

From a centralized facility, and after appropriate authentication of user and validation of the system identification and customer's status, an electronic enabler such as an alphanumeric passcode may be generated and electronically transmitted to the user via an electronic mail system using communication links 19 and/or 21, preferably over a private communication link, but other public communications systems can work equally well, such as direct dial-up, Internet, or wireless communications. As previously set forth, it is understood that the external communications links include a closed intranet system, an open public communications system, or a combination thereof.

Figure 2:
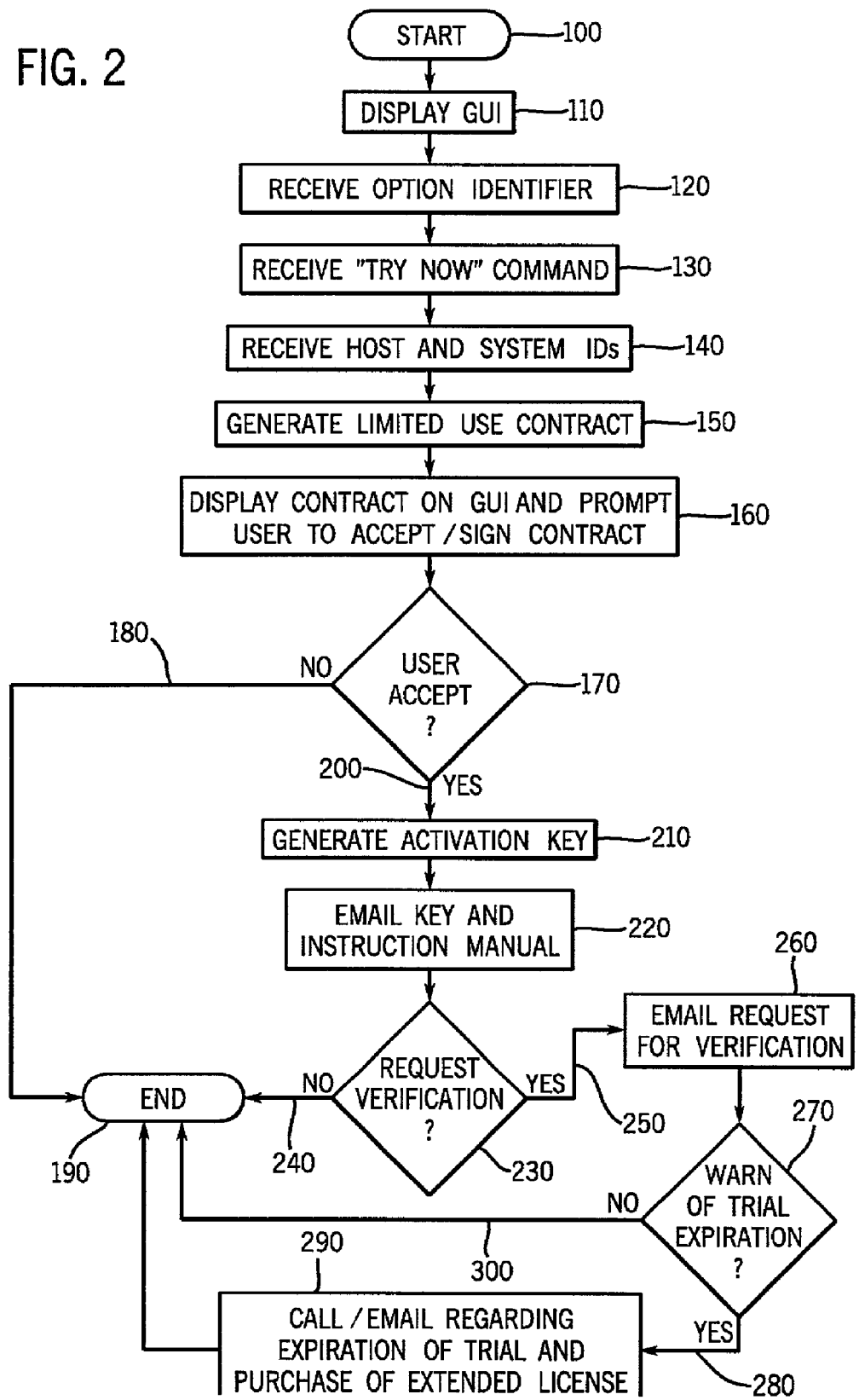
FIG. 2 is a flow chart showing the system-side process of the present invention.
Figure 3:
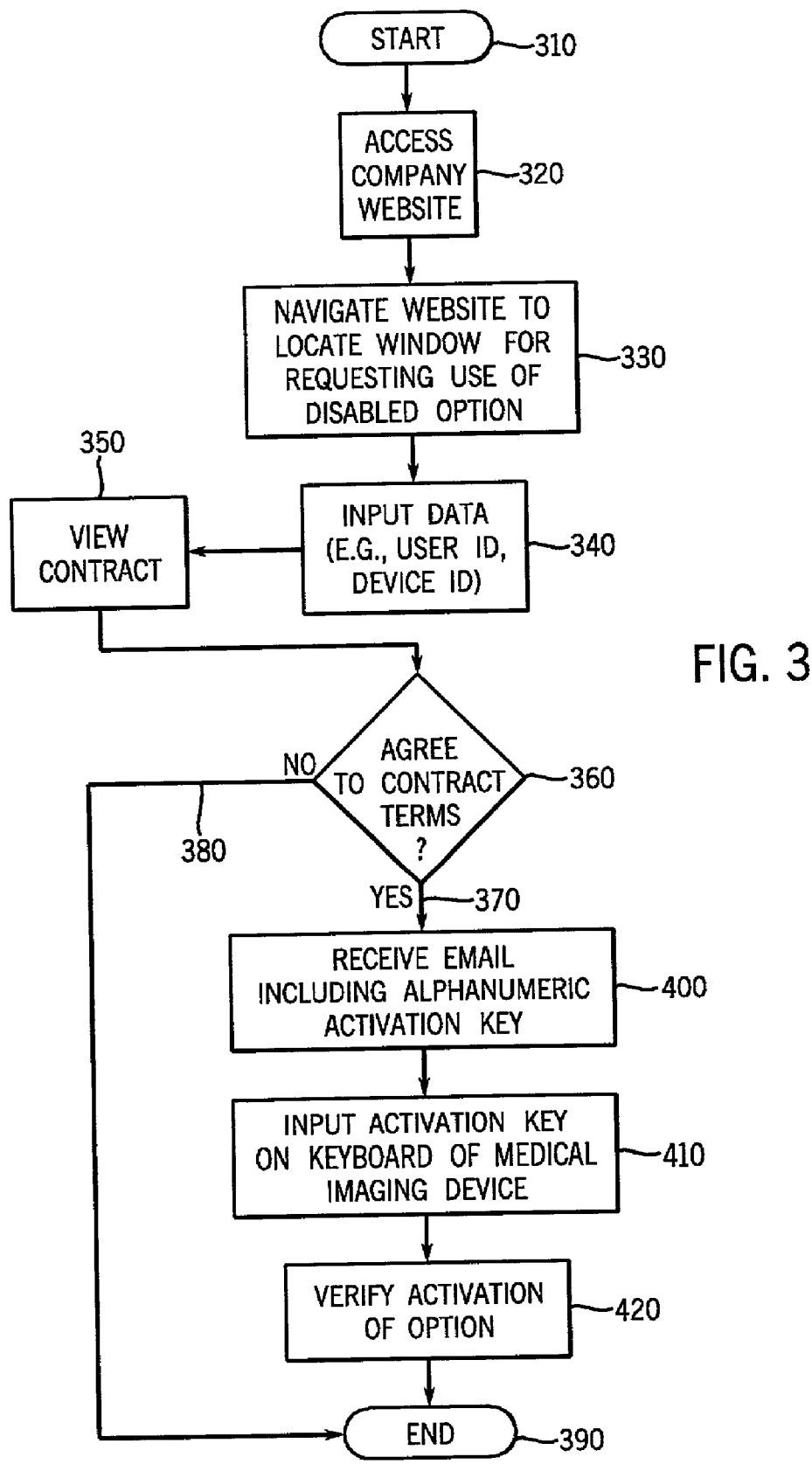
FIG. 3 is a flow chart showing the user-side process of the present invention.

FIGS. 2 and 3, as will be described below, set forth the steps of a system-side process and an user-side process, respectively. FIG. 2 will be described with respect to the process undertaken by a centralized facility in responding to a remote request to self-activate a disabled option resident on a device. FIG. 3 will be described with respect to the process undertaken by a user in formulating the request to self-activate the disabled option and subsequent activation of the option.

Referring to FIG. 2, the system-side process is initiated at 100, a GUI is displayed at 110 that is configured to facilitate a user request to self-enable a disabled option resident on the device. An option identifier is detected and electronically received at the centralized facility 120. The centralized facility then receives at 130 an indication that the user desires to activate the disabled option, such as, a "Try Now" command. After receiving the "Try Now" command, a computer at the centralized facility causes a prompt to be displayed on the GUI to the user requesting that the user input a number of identifiers, such as a system ID, a host ID, a facility ID, etc. The system receives the number of identifier inputs at 140. Based on the received inputs 120 and 140, a limited use contract is generated at 150. The contract includes terms specific to the user and the system and establishes the terms of the license granting the user access to the disabled option. The contract is then displayed on the GUI at 160 so that the user can "scroll" through the terms. The user is then prompted to accept or decline the terms at 170.

If the user considers the terms of use unacceptable and therefore declines to accept the contract 120, 180, the process ends 190 without the user being unable to self-activate the disabled option. On the other hand, if the contract terms are acceptable and the user provides an electronic indication of acceptance 200, i.e., electronic signature, then an activation key is generated at 210. In one embodiment, the activation key is an encrypted alphanumeric code that when input to the medical imaging device via a data entry module, such as a keypad, a keyboard, or a touch-tone screen, will activate the described option in accordance with the term of use agreed upon by the user.

A date/time stamp is embedded within the key and causes the software to expire according to the terms of the licensing contract. In a preferred embodiment, the key is embedded with code that activates the option for a trial period such as a 30 or 60-day trial.

After the encrypted software activation key is generated at 210, the computer at the centralized facility automatically emails the key to the user via an electronic mail system at 220. Alternatively, an instruction manual is also emailed to the user to assist the user in self-activating the option. The user can then view the key comprising an alphanumeric code and input the code on a keypad of the scanner to activate the software option. Preferably, the system also automatically sends an email to the user within 24 hours to verify that the user has self-activated and gained accessibility to the option 230. If a verification is not forwarded 230, 240, the process ends at 190. However, if verification is desired 230, 250, a verification email is sent to the user at 260. In a further embodiment, the system may elect to convey a follow-up message to the user prior to the expiration of the trial period 270. For example, an email can be sent to the user or a telephone call made to the user regarding the impending expiration of the licensing term and the opportunities available to purchase permanent access to the option. If a follow-up message is desired 270, 280, then an email is sent or a telephone call is placed at 290. If not 300, the process ends at 190. If a sales email is sent or a sales call placed, a representative of the company at or remote from the centralized facility may elect to personally contact the user. Following transmission of the email at 290, the system-side process ends at 190.

Referring to FIG. 3, the steps undertaken by a user for self-activating an option resident on a device, such as a medical imaging scanner, are set forth. The user or customer-side process begins at 310 with the user accessing the company website at 320. The website may be accessed via a public communication or private communication system as well as a land-based or wireless-based platform. Moreover, the user may access the website from a user workstation or an on-board computer of the medical imaging device.

Upon accessing the website at 320, the user navigates the website at 330 to locate the appropriate window or user interface for making a request to self-activate the option and gain access for a trial period. Once the appropriate window is located 330, the user inputs at 340 a series of parameters that identify the user, the option, the system, the host, etc. The inputs enable the centralized facility to generate terms of a licensing contract and configure the electronic enabler specific to the user inputs received.

At 350, the user can view, on the website, the terms of a licensing contract for granting the user limited access to the non-enabled software option. Preferably, the user views the terms of the contract at 350 and electronically accepts the terms of the contract at 360, 370. If the user does not accept the terms of the contract 360, 380, the user is denied access to self-activate and the user process ends at 390. If the user agrees to the terms of the licensing contract 360, 370, the user will then receive an email at 400 having an alphanumeric code forming the electronic enabler. In one embodiment, the user is also emailed an instruction manual to assist the user in self-activating and/or using the option. In another embodiment, the alphanumeric code which is automatically generated by the company is displayed to the user on the website.

Upon receipt of the electronic enabler, the user can self-activate the disabled option at 410 by inputting the alphanumeric code on the scanner or the scanner workstation. The user can input the code using a scanner workstation keypad, keyboard, or touch screen. Also, the code can be downloaded to a compact disk or floppy disk that can be read by the medical device for activation of the option. In one embodiment, the actions of the user conclude upon self-activation of the option. In another embodiment, the user can provide a verification email forwarded to the company at 420 verifying self-activation of the software option. The user's actions are then complete and the process ends at 390.

Accordingly, the present invention allows a customer to gain access to a disabled option for a trial period. The user can gain access with minimal steps by accessing a GUI such as a company or manufacturer website. Access is granted in accordance with a licensing agreement consented to by the user and the company/manufacturer/software provider. An alphanumeric code or software key is generated and emailed (or displayed) to the user as an electronic enabler. The alphanumeric code is specific to the user, the option, the medical imaging scanner, and the terms of use. Preferably, the alphanumeric code is encrypted and embedded with code that grants the user access for a specific trial period. The invention eliminates the need for direct connection between a centralized facility and the scanner. Because the user must input a series of identifying inputs, the system verifies that the user is authorized and the desired option to be activated is viable for the identified scanner. The present invention also enables self-activation of the option by the user rather than requiring a service technician or a field engineer to configure the scanner on-site. Eliminating such dependency on field personnel is advantageous for both the user and the company as those resources can be redirected.

Therefore, in accordance with one embodiment of the present invention, a method to remotely permit user enablement of software options resident on a medical imaging device includes receiving a request and I.D. data from a user of a remotely located stand-alone medical imaging device seeking access to a non-enabled option resident on the device. The method further includes generating an electronic enabler configured to enable the non-enabled option in transmitting the electronic enabler to the user. The method further includes providing instructions to the user to install the electronic enabler in the remotely located stand-alone medical imaging device to activate the option on the remotely located stand-alone medical imaging device.

In accordance with another embodiment of the invention, an access granting system is disclosed comprising a stand-alone device having a data entry module and further having at least one disabled option resident in memory thereof. The system includes a centralized facility located remotely from the user. The system includes a computer programmed to display a GUI configured to facilitate user activation of the at least one disabled option. The computer is further programmed to receive from a user of the stand-alone device a request to activate the at least one disabled option and generate an alphanumeric code. The computer is also programmed to electronically transmit the alphanumeric code to the user whereupon user inputting of the alphanumeric code on the data entry module activates the at least one disabled option of the stand-alone device.

Another embodiment of the present invention includes a computer data signal embodied in a carrier wave and representing a sequence of instructions which, when executed by at least one processor, causes the processor to receive, at a centralized facility, a request to activate an option resident in memory of a remote device from a user remote from the centralized facility. The sequence of instructions also causes the processor to determine whether the end user is qualified, and if so, grant access to the option resident in the remote device for a limited time period. A software key is generated by the computer to allow access to the option for the limited time period and sent to the user. The software key upon activation by the user allows the user to enable the option.

In accordance with a further embodiment of the present invention, a computer readable storage medium is provided and includes a computer program stored thereon. The computer program has a set of instructions that when executed by a computer causes the computer to display a GUI configured to facilitate user activation of a disabled option resident on a medical imaging device. The instructions further cause the computer to receive a number of user inputs and generate an alphanumeric code in response thereto. The alphanumeric code is configured to activate the disabled option upon user inputting of the alphanumeric code on a data entry module of the medical imaging device. The computer is then caused to automatically convey the alphanumeric code to the user.

The present invention has been described in terms of the preferred embodiment, and it is recognized that equivalents, alternatives, and modifications, aside from those expressly stated, are possible and within the scope of the appending claims.

The invention claimed is:

1. A method to remotely permit user enablement of software options resident on a medical imaging device, the method comprising the steps of:
   (A) prompt a user to input a request and I.D. data into a data entry module remote from and communicatively coupled with a remotely located stand-alone medical imaging device, the request and I.D. data including a user identifier, a system identifier, a stand-alone device identifier, and a non-enabled option identifier;
   (B) receiving, at a centralized facility, the request and I.D. data from the user, via the data entry module remote from and communicatively coupled with a remotely located stand-alone medical imaging device, wherein the request and I.D. data seek access to the non-enabled option resident on the device;
   (C) generating an electronic licensing contract;
   (D) prompt the user to either accept or decline the licensing contract;
   (E) if the user accepts the licensing contract, generating an electronic enabler configured to enable the non-enabled option;
   (F) transmitting the electronic enabler to the user via the data entry module; and (G) providing instructions to the user via the data entry module to install the electronic enabler in the remotely located stand-alone medical imaging device to activate the option on the remotely located stand-alone medical imaging device, upon user-input of the enabler on the data entry module or the stand-alone medical imaging device.

2. The method of claim 1 further comprising the step of enabling user access to the option for a predefined period of time.

3. The method of claim 2 further comprising the step of enabling user access to the option for a trial period of thirty days.

4. The method of claim 1 wherein the step of transmitting the electronic enabler includes one of forwarding the electronic enabler to the user via an electronic mailing system, displaying the electronic enabler on a graphical user interface coupled with the data entry module via an Internet connection, and providing the electronic enabler via a telephone system coupled with the data entry module.

5. The method of claim 1 further comprising the step of granting the license to use the software option for a predetermined trial period.

6. The method of claim 1 further comprising the step of transmitting a request for verification of enablement of the software to the user.

7. The method of claim 1 wherein the enabler comprises an alphanumeric code.

8. The method of claim 1 further comprising the step of generating the electronic enabler upon user satisfaction of a set of criteria, the set of criteria including at least one of a user account, a host identifier, a device identifier, and an option identifier.

9. The method of claim 1, wherein the data entry module comprises a workstation remote from the centralized facility and communicatively coupled with the remotely located stand-alone medical imaging device, wherein the step of receiving a request includes the step of receiving the request at a centralized facility via a graphical user interface accessed by the user at the workstation remote from the centralized facility.

10. The method of claim 1 further comprising the steps of:
enabling user access to the option for a trial period; and
conveying a follow-up message to the user prior to an expiration of the trial period.

11. The method of claim 10 wherein the step of conveying the follow-up message includes conveying a notice of one or more of:
impending expiration of a licensing term to use the software; and
opportunity available to purchase permanent access to the option.

12. An access granting system comprising:
a stand-alone device having a data entry module communicatively coupled therewith and further including at least one disabled option resident in memory thereon; and
a centralized facility located remotely from the device and having at least one computer programmed to:
display a graphical user interface configured to facilitate user activation of the at least one disabled option;
receive a request to activate the disabled option from a user remote from the device and the centralized facility;
generate an alphanumeric code;
electronically transmit the alphanumeric code to the user, the alphanumeric code configured to activate the disabled option upon inputting of the alphanumeric code by the user on the data entry module communicatively coupled with the stand-alone device;
prompt the user to input a set of identifying data including a user identifier, a system identifier, a stand-alone device identifier, and a disabled option identifier;
generate an electronic licensing contract; and
prompt the user to either accept or decline the licensing contract.

13. The system of claim 12 wherein the at least one computer is further programmed to either email the alphanumeric code to the user or display the alphanumeric code on the graphical user interface.

14. The system of claim 12 wherein the alphanumeric code is further configured to activate the disabled option for a predetermined and limited time period.

15. The system of claim 14 wherein the stand-alone device includes at least one medical imaging scanner and the alphanumeric code is configured to automatically disable the activated option upon expiration of the predetermined and limited time period.

16. The system of claim 12 wherein the at least one computer is further programmed to electronically transmit a request for verification of activation of the disabled option to the user.

17. The system of claim 12 wherein at least one computer is further programmed to electronically transmit an instructional manual to the user, the manual including a set of instructions for activating the disabled option.

18. The system of claim 12 wherein at least one computer is further programmed to receive the request to activate the disabled option from the user remote from the device and the centralized facility initiated by the user from the data entry module in a remote link that serves to connect the centralized facility to the user by a dialup link to a web server in the centralized facility communicatively coupled with the stand-alone device.

19. The system of claim 12 wherein at least one computer is further programmed to receive the request to activate the disabled option from the user remote from the device and the centralized facility initiated by the user from the data entry module in a remote link that serves to connect the centralized facility to the user by a telephone and telephone connection through a conventional telephone network and to an interactive voice recognition system (IVR) in the centralized facility communicatively coupled with the stand-alone device.

20. The system of claim 12 wherein the data entry module comprises a keypad, a keyboard, or a touch-tone screen.

21. A computer readable storage medium having a computer program stored thereon, the computer program having a set of instructions that when executed by a computer causes the computer to:
display a graphical user interface configured to facilitate user activation of a disabled option resident on a medical imaging device by a user remote from the medical imaging device;
receive a number of user inputs from the user;
generate an alphanumeric code configured to activate the disabled option upon inputting of the alphanumeric code by the user on a data entry module communicatively coupled with the medical imaging device;

automatically convey the alphanumeric code to the user; and wherein the instruction to convey the alphanumeric code includes one of emailing the alphanumeric code to the user via an electronic messaging system and displaying the alphanumeric code on the graphical user interface coupled with the data entry module.

22. The computer readable storage medium of claim 21 wherein the set of instructions further causes the computer to determine a period of delay, the period of delay representing a time to allow the user to activate the disabled option.

23. The computer readable storage medium of claim 22 wherein the set of instructions further causes the computer to automatically generate an electronic request for verification of activation and email the electronic request to the user upon expiration of the period of delay.

24. The computer readable storage medium of claim 23 wherein the set of instructions further causes the computer to accept a verification email from the user verifying self-activation of the disabled option.

25. The computer readable storage medium of claim 22 wherein the period of delay is 24 hours.

26. An access granting system comprising:

a stand-alone device having a data entry module communicatively coupled therewith and further including at least one disabled option resident in memory thereon; and a centralized facility located remotely from the device and having at least one computer programmed to:

display a graphical user interface configured to facilitate user activation of the at least one disabled option;

receive a request to activate the disabled option from a user remote from the device and the centralized facility;

generate an alphanumeric code;

electronically transmit the alphanumeric code to the user, the alphanumeric code configured to activate the disabled option upon inputting of the alphanumeric code by the user on the data entry module communicatively coupled with the stand-alone device; and wherein the at least one computer is further programmed to receive the request to activate the disabled option from the user remote from the device and the centralized facility initiated by the user from the data entry module in a remote link that serves to connect the centralized facility to the user by a dialup link to a web server in the centralized facility communicatively coupled with the stand-alone device.

27. An access granting system comprising:

a stand-alone device having a data entry module communicatively coupled therewith and further including at least one disabled option resident in memory thereon; and a centralized facility located remotely from the device and having at least one computer programmed to:

display a graphical user interface configured to facilitate user activation of the at least one disabled option;

receive a request to activate the disabled option from a user remote from the device and the centralized facility;

generate an alphanumeric code;

electronically transmit the alphanumeric code to the user, the alphanumeric code configured to activate the disabled option upon inputting of the alphanumeric code by the user on the data entry module communicatively coupled with the stand-alone device; and wherein the at least one computer is further programmed to receive the request to activate the disabled option from the user remote from the device and the centralized facility initiated by the user from the data entry module in a remote link that serves to connect the centralized facility to the user by a telephone and telephone connection through a conventional telephone network and to an interactive voice recognition system (IVR) in the centralized facility communicatively coupled with the stand-alone device.

* * * * *